United States Patent
Zito, Jr.

[15] 3,642,538
[45] Feb. 15, 1972

[54] METAL HALIDE BATTERY
[72] Inventor: Ralph Zito, Jr., Westford, Mass.
[73] Assignee: The Zito Company, Inc., Derry, N.H.
[22] Filed: Oct. 31, 1969
[21] Appl. No.: 872,993

[52] U.S. Cl. ................................................136/6, 136/30
[51] Int. Cl. .....................................................H01m 35/00
[58] Field of Search .................... 136/6, 83, 30, 86, 154–155, 136/121–122, 22, 100, 103

[56] References Cited

UNITED STATES PATENTS

| | | | |
|---|---|---|---|
| 3,328,202 | 6/1967 | Riffe | 136/30 X |
| 3,382,102 | 5/1968 | Zito, Jr. | 136/30 |
| 3,320,093 | 5/1967 | Harding et al. | 136/122 |
| 3,285,781 | 11/1966 | Zito, Jr. | 136/6 X |
| 3,408,232 | 10/1968 | Blue et al. | 136/30 |
| 2,853,444 | 9/1958 | Pye et al. | 204/108 |

*Primary Examiner*—Anthony Skapars
*Attorney*—E. H. Kent

[57] ABSTRACT

A rechargeable metal halide battery, in which a salt of an electroplatable metal and a halogen selected from the class consisting of chlorine, bromine and iodine is electrolyzed from solution in a liquid medium during the charging cycle and reformed during the discharging cycle, the battery comprising at least one electrode for making an external electrical connection to the battery, adapted to be immersed in the liquid medium, and a total interface resistance, per square inch of the extended surface, not greater than about 0.10 ohm, the electrode comprising a conductive layer including an electroconductive carbon mass, the mass having a polymeric reinforcing agent in intimate contact therewith to render the mass stable to the liquid medium, the polymeric reinforcing agent being substantially inert to halogen in concentrations present in the battery, and the conductive layer being at least coextensive with the extended electrolyte-contacting surface and having a resistivity, $\rho$, not greater than $(0.10 \times d)/l^2$ ohm-in., where $d$ is the thickness of the conducting layer and $l$ is the longest electrical flow path through the conductive layer from the liquid medium.

22 Claims, 3 Drawing Figures

3,642,538
FIG 1
FIG 2
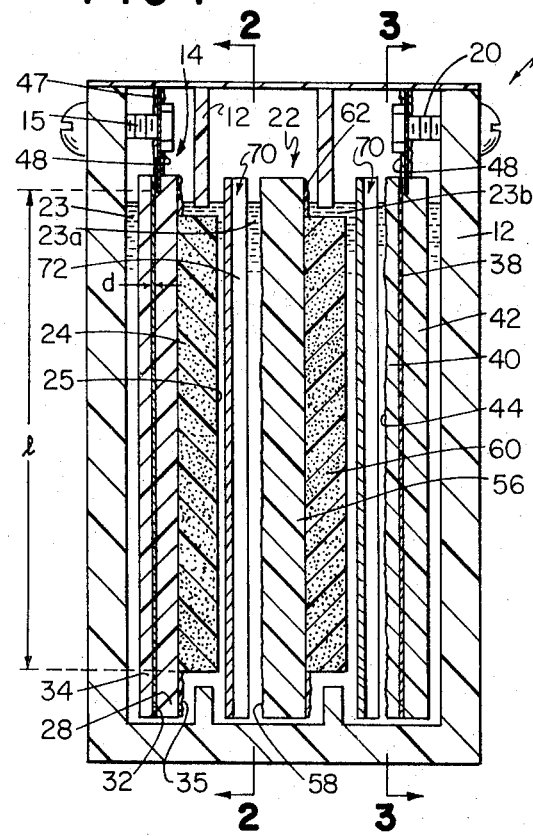
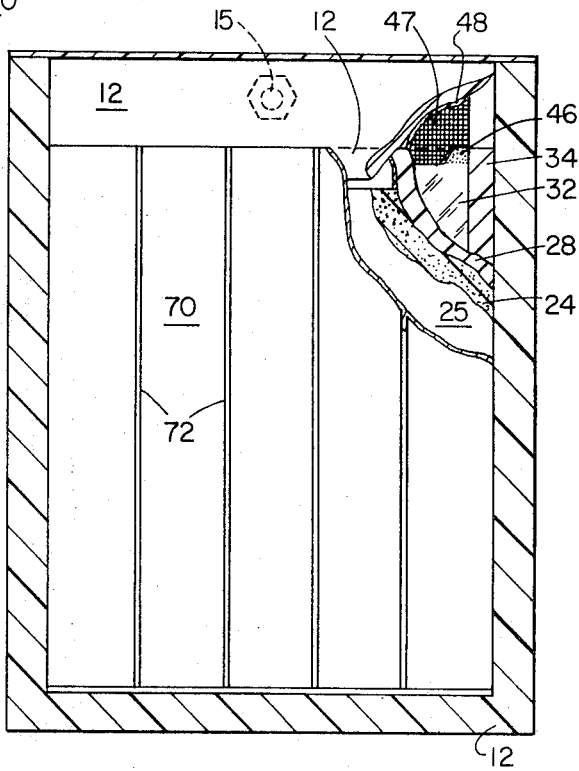
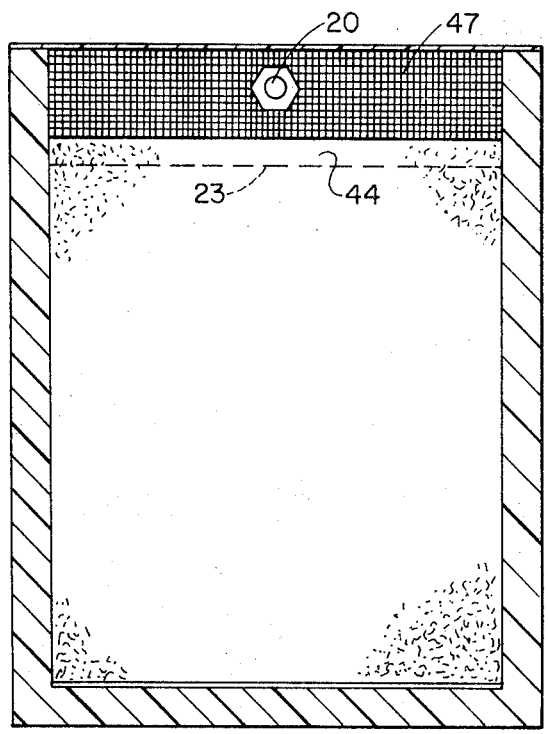
FIG 3

METAL HALIDE BATTERY

This invention relates to secondary batteries and battery components.

One object of this invention is to provide inexpensive, rechargeable, reliable, high-capacity energy cells.

Another object is to provide improved batteries of simple, economical construction having a high watt-hours/pound output; and reasonable charge and discharge times.

Another object is to provide improved batteries which operate at ambient temperatures and pressures, for running moderate power devices, such as lawnmowers and other garden tools, "power tools," small electric vehicles (e.g., golf carts), and the like.

A further object is to provide a metal halide battery which is safe and reliable, has an energy output at least comparable to alkaline-type batteries, and yet is lightweight, durable, and relatively maintenance free.

Still another object is to provide a safe, economical, noncorrodible, and simple zinc bromide battery.

The invention features a rechargeable metal halide battery, in which a salt of an electroplatable metal and a halogen selected from the class consisting of chlorine, bromine, and iodine is electrolyzed from solution in a liquid medium during the charging cycle and reformed during the discharging cycle, the battery comprising at least one electrode for making an external electrical connection to the battery, adapted to be immersed in the liquid medium, having an extended surface for contacting the liquid medium, and a total interface resistance, per square inch of the extended surface, not greater than about 0.10 ohm, the electrode comprising a conductive layer including an electroconductive carbon mass, the mass having a polymeric reinforcing agent in intimate contact therewith to render the mass stable to the liquid medium, the polymeric reinforcing agent being substantially inert to halogen in concentrations present in the battery, and the conductive layer being at least coextensive with the extended electrolyte-contacting surface and having a resistivity, $\rho$, not greater than $(0.10 \times d)/l^2$ ohm-in., where $d$ is the thickness of the conducting layer and $l$ is the longest electrical flow path through the conductive layer from the liquid medium.

Preferably, the conductive layer is of substantially rectangular configuration having one side remote from the electrolyte adapted to make the external electrical connection along its entire width, and $l$ is the distance along the portion from the so-adapted side to the opposite side, i.e., to the side furthest immersed in electrolyte.

In one preferred embodiment, the conductive layer comprises an electroconductive carbon sheet (e.g., comprising a mass of expanded graphite particles compressed together in the absence of a binder), having the above-described resistivity, and a reinforcing layer, along the surface of the carbon sheet facing the next adjacent electrode, in electrical contact with the carbon sheet, and located between the carbon sheet and the electrolyte; the conductive layer is inert to bromine, comprises polymeric reinforcing agent, and is capable of conducting electricity between the carbon sheet and the electrolyte. A preferred reinforcing layer comprises highly electroconductive carbon particles (e.g., graphite and carbon black) secured into an integral layer by a polymeric reinforcing agent which is, where the halogen is bromine, a polymer substantially inert to bromine, selected from the class consisting of polyfluorocarbons, polychlorofluorocarbons (e.g., polymonochlorotrifluoroethylene), polymers of monomers containing a major portion of vinylidene chloride, poly (vinyl chloride), poly (methyl methacrylate), polyethylene, and polypropylene. A second reinforcing layer, also inert to halogen in concentrations present in the battery, may be located along the other surface of the carbon sheet, arranged together with a first reinforcing layer to overlie all portions of the carbon sheet which would otherwise be in contact with electrolyte, and preferably is bonded to the first reinforcing layer through apertures in the carbon sheet. Excellent bonds are achieved if the polymeric reinforcing agents in the two layers are identical.

For making electrical contact to the carbon sheet, a thin metal (e.g., zinc) film may be electroplated onto an exposed surface of the carbon sheet, and a metallic member, protruding from the battery, adhered to the metal film by an electroconductive adhesive (e.g., solder).

For use as a cathode, the electrode preferably includes additionally a halogen entrapment layer, bonded to the reinforcing layer, which is inert to halogen in concentrations present in the battery and comprises a halogen entrapping substance. For use as an anode, the electrode has an electroplating surface provided by the reinforcing layer, and this surface is preferably rough so as to provide a large number of electroplating sites.

In a preferred metal halide battery, two such electrodes are provided to function as end electrodes (e.g., as the sole electrodes in a single-cell battery or the end electrodes in a bipolar battery), one a cathode including a halogen entrapment layer and the other an anode having an electroplating surface on the reinforcing layer, the end electrodes providing means for connecting the battery to external electrical equipment. Preferably, a nonelectroconductive porous separator is placed between adjacent cathode and anode surfaces to lessen the tendency of halogen to migrate from the halogen-entrapment layer of the cathode to the anode.

Where the halogen is bromine (with which a preferred electroplatable metal is zinc), a preferred entrapping substance is a bromine absorbent, such as activated carbon. The bonding agent used for the activated carbon absorbent layer may be selected from the above-described polymeric reinforcing agents. The layer preferably includes a thin (less than 2 mils) porous film along its extended surface, the film being formed of the same bonding agent.

In another embodiment, the electrode portion, having the above-described resistivity, consists of highly electroconductive carbon particles bonded into a integral electrode portion by a small but effective amount of polymeric reinforcing agent. Preferably, the electrode consists of at least about 90 percent by weight of these carbon particles and, where halogen is bromine, the reinforcing agent is a polymer substantially inert to bromine, selected from the class consisting of polyfluorocarbons, polychlorofluorocarbons (e.g., polymonochlorotrifluoroethylene), polymers of monomers containing a major portion of vinylidene chloride, poly (vinyl chloride), poly (methyl methacrylate), polyethylene, and polypropylene.

Other objects, features and advantages will appear to one skilled in the art from the following description of preferred embodiments of the present invention, taken together with the attached drawings thereof, in which:

FIG. 1 is a sectional view of a schematic illustration of one embodiment of the present invention;

FIG. 2 is a sectional view, partially broken away, of the embodiment of FIG. 1, along line 2—2 thereof; and, FIG. 3 is another sectional view of the embodiment of FIG. 1, along line 3—3 thereof.

The figures show a battery 10 having an outer case 12, an end (battery) cathode 14 electrically connected to cathode terminal screw 15, an end (battery) anode 18 electrically connected to anode terminal screw 20, one intermediate composite electrode 22, and a liquid electrolyte medium 23.

Referring to FIGS. 1 and 2, end cathode 14 includes a halogen-entrapment (e.g., halogen-adsorbent) layer 24, having an extended surface 25 in contact with electrolyte 23, and bonded, along its opposite surface, to first reinforcing layer 28. Electroconductive carbon sheet 32, to which external electrical connection is made, is sandwiched between first cathode-reinforcing layer 28 and second cathode-reinforcing layer 34, the two layers preferably being bonded to one another through apertures provided in carbon sheet 32. Entrapment layer 24 and reinforcing layers 28, 34 are substantially inert to halogen in concentrations present in the batteries (by "halogen" is meant chlorine, bromine, and iodine, but not fluorine).

Reinforcing layer 28 should be capable of conducting electricity between entrapment layer 24 and carbon sheet 32, and thus has a resistivity, $\rho$, and thickness, $d$, such that $\rho d$ is equal to or less about 0.1 ohm-in.$^2$. Halogen-entrapment layer 24 preferably permits the flow of electricity between electrolyte and reinforcing layer. Exposed portions of reinforcing layer 28 are coated with a protective film 35, which is substantially inert to halogen and is an electrical insulator.

End anode 18 has a carbon sheet 38 sandwiched between a first anode-reinforcing layer 40 and a second anode-reinforcing layer 42, which have properties identical, respectively, to carbon sheet 32, first cathode-reinforcing layer 28, second cathode-reinforcing layer 34. Reinforcing layer 40 has a roughened surface 44 (e.g., sandblasted) in contact with the electrolyte providing a metal electroplating surface.

For making electrical connection to a carbon sheet 32 or 38, each sheet includes an electroplated zinc layer 46, to which is soldered a metal screen 47, which has a portion protruding from the electrode and electrically connected to a terminal screw 15 or 20. Reinforcement layers 28 and 34 are then laminated to one another through the apertures in carbon sheet 32 or 38 and in screen 47, solder being applied so as not to mask these apertures. Preferably the reinforcing layers overlap the edges of the carbon sheet so as to entirely encase it within. Exposed portions of the screen are coated with a protective film 48, which is inert to bromine.

Each carbon sheet has a resistivity, $\rho$, not greater than $(0.10 \times d) / l^2$ ohm-in., where $l$, as shown in FIG. 1, extends along the carbon sheet from the lower edge of extended surface 35 at least to the beginning of the metallized upper portion of the carbon sheet, and $d$ is the thickness of the carbon sheet.

Composite electrode 22 has a substantially halogen-inert conducting portion 56, including on one side a roughened electroplating surface 58 (like electroplating surface 44 of anode 18) and, bonded to its opposite side, a halogen-entrapment (e.g., halogen-adsorbent) portion 60, also substantially inert to halogen, and a protective electrical insulating film 62, which may be identical to protective film 35. Halogen-entrapment portion 60 has an extended surface 63 in contact with electrolyte 23. Conducting portion 56 should have a combined resistivity, $\rho$, and thickness, $d$, such that $\rho d$ is less than or equal to about 0.1 ohm-in.$^2$. Entrapment portion 60 should permit flow electricity between the electrolyte and conducting portion 56.

Porous separators 70, having spaced vertical ribs 72, are located between each adjacent anodic and cathodic surface, and retard the tendency of halogen molecules to migrate to the anode, thereby improving the charge retentivity of the battery.

The interface resistance for each total cathode or anode (whether for an end or for a composite electrode) should be, per square inch of electrolyte-contacting area, not greater than about 0.05 ohm.

The electrolyte includes a liquid medium having a dissolved salt of a halide and an electroplatable metal which is electrolyzed during the charging cycle of the battery (i.e., by connecting a voltage source across the battery to terminal screws 15 and 20), the metal electroplating on the anode-electroplating surfaces, and the halide-forming molecular halogen, which is substantially entrapped within the halogen-entrapment layer or portion. The halogen-entrapping material should preferably form bonds with halogen of sufficient energy to keep the halogen molecules near the cathode during charging and charged periods, yet of low enough energy so as not to interfere with ionization of halide during the discharging cycle.

The halogen may be chlorine, bromine, or iodine. In general, the metal should be repeatedly electroplatable and must not be corroded in the liquid electrolyte medium, and the metal halide salt must be sufficiently soluble in the liquid medium to be electroplatable. Where an aqueous liquid medium is employed, among the useful metals are, e.g., zinc, nickel, cadmium, tin, lead, and copper. In a nonaqueous electrolyte medium, such as may be utilized for chlorine, even water-unstable, reactive metals, such as sodium, potassium and lithium may be used in addition to the above-listed metals, with suitably metal-inert bonding agents.

A preferred electrolyte is zinc bromide in an aqueous solution. This salt has a reasonably high potential of 1.83 volts at room temperature and atmospheric pressures, is highly soluble in water to provide a low-resistivity electrolyte, and has a calculated free energy per pound of about 200 watt-hours. The molarity of the electrolyte solution is preferably between 0.5 and 9, (more preferably, not more than about 7) and is, of course, at its lowest value at full charge (preferably, 0.5M or less), and its highest at full discharge.

One preferred carbon sheet comprises a mass of expanded graphite particles compressed together in the absence of a binder, available from Union Carbide Corp. under the name "Grafoil," and described in U.S. Pat. No. 3,404,061. The reinforcing layers bonded thereto reduce the tendency of this carbon sheet to swell from contact with the electrolyte, thereby preserving both high conductivity and reproducible battery cycles. Another preferred electrode component for making electrical connection consists of highly electroconductive carbon particles (e.g., graphite or carbon black), reinforced by a polymeric reinforcing agent which, in lieu of being formed into discrete layers, is admixed with the carbon particles, in a small but effective amount required to provide a conducting member having structural integrity. Preferably, in order that the member may be sufficiently lightweight (e.g., have a thickness, $d$, less than about one-fourth inch) this member is at least 90 percent by weight electroconductive carbon.

Where the halogen is bromine (and, hence, the preferred halogen entrapment layer consists of activated carbon particles), the polymeric reinforcing agent and the bonding agent for the bromine-adsorbent layer should be substantially inert to bromine in concentrations present in the battery. However, reinforcing or bonding agents which might be degraded by concentrated bromine (liquid), such as polymers having a major portion of vinylidene chloride, are nonetheless useable so long as the concentrations of bromine produced in the battery remain below those capable of degrading the agent. In general, when employing degradable polymers or copolymers of vinylidene chloride or vinyl chloride, the maximum bromine concentration in the adsorbent layer should not exceed about 0.5M. The bonding agent should preferably merely bond the activated carbon particles together, without flowing into the adsorbent pores thereof, and should be present in the minimal amount required to give structural integrity to the adsorbent layer. Preferably, the adsorbent layer adsorbs at least half its weight of bromine, and, more preferably an amount of bromine equal to or even greater than its weight. A thin (less than about 5 mils) porous film of bonding agent may be formed on the surface of the adsorbent layer facing the electrolyte to add structural stability to the layer, and also improve the charge retentivity of the battery by tending to retard migration of bromine from the adsorbent layer.

Among the sufficiently bromine-inert polymers useful as reinforcing and bonding agents are, e.g., the polyfluorocarbons, such as polytetrafluoroethylene ("Teflon," available from E. I. duPont de Nemours & Co.), poly (vinylidene fluoride) ("Kynar," available from Penwalt Co.), polymonochlorotrifluoroethylene ("CTFE," available from Allied Chemical Co.), and "FEP," a fluorinated polyethylene available from the same duPont; poly (vinyl chloride) homopolymers (plasticized or unplasticized) (e.g., "Geon 222," available from B. F. Goodrich Co.); poly (vinylidene chloride) homopolymers and copolymers (50 percent or greater vinylidene chloride) such as acrylonitrile and vinyl chloride copolymers (available generally under the trade name "Saran" from Dow Chemical Co.); polymethacrylates such as poly (methyl methacrylate) ("Plexiglas," available from Rohm & Haas Co.). Since the carbon sheet or the electroconductive carbon particles are bromine inert, inexpensive bromine-permeable, reinforcing polymers such as polyethylene and polypropylene are particularly preferred.

A preferred reinforcing layer, for use with a carbon sheet in a metal bromide battery, consists of highly electroconductive carbon particles (e.g., graphite or carbon black) bonded together by one of the above-listed reinforcing agents. Preferably, adjacent reinforcing or reinforcing and bonding agents are identical or similar so that a good bond may be achieved between the layers. Where a polyalkylene is used in the adsorbent layer, a vinylidene chloride homo- or copolymer, e.g., may be utilized in the barrier layer. The second reinforcing layer, as well as the various protective films, for use in a zinc bromide battery, may be constructed similarly to the first reinforcing layer, or may consist simply of a film of any of the polymeric reinforcing or bonding agents. Where a copper screen is used to connect the carbon sheet to an external terminal, the screen should terminate above the electrolyte level if an electrolyte-permeable reinforcing layer (e.g., one utilizing polyethylene or polypropylene) is used, to avoid corrosion of the copper screen.

The entrapment portion of the composite electrode (or electrodes, the number depending on the voltage level desired for the battery) may, again, for a metal bromide battery, be composed of adsorbent activated carbon particles bonded together by a suitable substantially bromine-inert bonding agent, such as one of the above-described polymeric reinforcing agents. The "conductive portion" is composed of highly electroconductive carbon particles (e.g., graphite or carbon black) bonded together with one of the same group of bonding agents utilized in the entrapment portion, and need have sufficient electrical conductivity only to pass electricity between electrolyte regions 23a and 23b.

The separator 70 must have sufficient porosity to allow free passage therethrough of electrolyte, yet not be so porous as to present no obstacle to free passage therethrough of bromine molecules. The pores may be of substantially larger size than bromine molecules, and still present some impedance to, although not prevent entirely, passage of bromine molecules. One useful separator material is a porous (pores in the range of 200 to 500 angstroms in diameter) polyethylene separator, structured as shown in the figures, having a thickness of about one thirty-second inch. Dialysis membranes (e.g., having pore sizes in the order of 50 angstroms) are also useful.

Iodine being less reactive than bromine, all of the bonding agents listed for bromine are sufficiently inert to iodine for use as bonding agents in forming reinforcing and entrapment layers for metal iodide batteries, whereas at least the polyfluorocarbons and polychlorofluorocarbons are suitable bonding agents for metal chloride batteries.

A preferred material for making the battery case is poly(methyl methacrylate). The frame may be cemented to the cathodes using a polymeric material similar to that used for making the electrodes. For example, a "Saran" cement (e.g., a mixture of "Saran-130" resin, poly (methyl methacrylate) and a suitable solvent) is particularly useful for "Saran" or "Plexiglas" electrodes.

An illustrative method for preparing a battery in accordance with the present invention will now be described, utilizing polyethylene. This method is generally applicable to other bonding and reinforcing agents, with the relative amounts of materials and moulding temperatures suitably adjusted to provide electrodes having both the required resistivities and adsorptivities, as well as mechanical integrity.

Fifteen grams of polyethylene (FN-510 powder, manufactured by U.S. Indus. Chem. Co.) and 20 g. Dixon 1112 graphite, after being mixed together in a blender, were placed into a 6×9×⅛ inch mold, heated for 2 minutes at 250° F., compressed under 30 tons for 5 minutes at 250° F., and cooled in a mold under 30 tons compression to form a polyethylene-graphite reinforcement layer.

A 6½×4×0.010 inch sheet of "Grafoil," having a resistivity of $3\times10^{-4}$ ohm-in., was immersed as anode to a level of 1½ inch in a 3-molar zinc bromide electrolyte (containing, also, 1.5 g. of polyoxyethylene brightener per 100 ml. of water in the electrolyte), with a 4×8 inch piece of zinc as anode. The resultant cell was charged at 1 a. for 10 minutes, and the zinc-electroplated "Grafoil" removed, rinsed, and air-dried. A 4×2 inch sheet of copper screen was then soldered to the Grafoil, with the screen overlapping the plated end of the "Grafoil" by about 1½ inch. The "Grafoil" was then perforated with a number of 5/32-inch holes.

The "Grafoil" was then laminated between two reinforcement layers—a polyethylene-graphite sheet and a polyethylene sheet—in a mold at 250° F., including 5 tons compression for 5 minutes, and cooled in a mold under 5-ton compression. The polyethylene-graphite sheet and the polyethylene sheet were each 7½×5 inch, and were arranged to leave a ½-inch border around three sides of the Grafoil, with the copper screen protruding about one-half inch from the unbordered side of the laminate.

To form the cathode, 24 g. of a mixture of 90 percent by weight activated carbon (Barneby Cheney UU Charcoal) and 10 percent by weight polyethylene (FN-510 powder, available from U.S. Indus. Chem. Co.) was ball-milled for 2 hours, and troweled onto the polyethylene-graphite side of a laminate placed in the mold. The mold was turned over with the activated carbon mixture facing downward and agitated so that the smaller polyethylene particles would form a thin, porous film (less than about 2 mils thick) on the bottom of the mold. The mold was then heated at about 350° F. in an oven for 15 minutes, removed from the oven and compressed under about 150 lb. for 5 minutes to assure good electrical conductivity to the reinforcing layer, by causing the activated-carbon particles to penetrate any clear polyethylene outer film formed adjacent the laminate during molding and cooled. An anode was prepared by sandblasting the polyethylene-graphite side of a laminate.

A single-cell battery was constructed, utilizing the above-described polyethylene end cathode and end anode, separated by a single porous polyethylene separator. The total surface resistance across any one of the two electrolyte-contacting surfaces was, per square inch, with a 3.0 (full discharge) molar solution of zinc bromide in water as an electrolyte, not greater than about 0.05 ohm. The conducting length, $l$, of the carbon sheet was 5½ to 6 in., and the thickness was 0.010 in. giving a product, $0.10 d/l^2$, of approximately $3\times10^{-5}$ ohm-in., which is less than $3\times10^{-4}$ ohm-in., the resistivity of the carbon sheet. The single-cell battery was cycled more than about 300 times, and had a total capacity of about 7 to 10 watt-hours (about 21 to 30 watt-hours/lb.).

Other embodiments (e.g., forming an end electrode by vacuum-impregnating a carbon sheet with a suitable reinforcing agent) will occur to those skilled in the art.

What is claimed is:

1. A rechargeable metal halide battery, in which a salt of an electroplatable metal and a halogen selected from the group consisting of chlorine, bromine, and iodine is electrolyzed from solution in a liquid electrolyte medium during the charging cycle and reformed during the discharging cycle, comprising at least one nonmetallic electrode suitable for connection to an external electrical circuit to charge and discharge said battery, adapted to be immersed in said liquid medium, having an extended surface for contacting said liquid medium, and a total interface resistance, per square inch of said extended surface, not greater than about 0.10 ohm, said electrode comprising an electroconductive carbon sheet, for connection to said circuit, formed of expanded graphite particles compressed together in an electroconductive mass in the absence of a binder, a reinforcing layer in intimate contact with each side of said sheet, said reinforcing layers overlying all portions of said carbon sheet which would otherwise be in contact with electrolyte, while permitting electrical current to flow between said electrolyte and said sheet, for charging and discharging said battery, each said layer comprising a polymeric reinforcing agent inert to said halogen in concentrations present in said battery, said carbon sheet being at least coextensive with said extended electrolyte-contacting surface, and having a resistivity, $p$, not greater than $(0.10 \times d)/l^2$ ohm-in., where $d$ is the thickness of said carbon sheet and $l$ is the longest electrical flow path through the said carbon sheet from the electrolyte to the point on the sheet at which the external electrical connection is made to the sheet.

2. A battery according to claim 1 wherein said conductive layer is of substantially rectangular configuration, and external electrical connection is made thereto along the side parallel to the furthest electrolyte-immersed side.

3. A battery according to claim 1 wherein said reinforcing layer comprises highly electroconductive carbon particles secured into an integral layer by said polymeric reinforcing agent.

4. A battery according to claim 3 wherein said halogen is bromine and said reinforcing agent is a polymer, inert to bromine and selected from the class consisting of polyfluorocarbons, polychlorofluorocarbons, polymers of monomers containing a major portion of vinylidene chloride, poly (vinyl chloride), poly (methyl methacrylate), polyethylene and polypropylene.

5. A battery according to claim 1 wherein said carbon sheet has apertures and said reinforcing layers are bonded together through said apertures.

6. A battery according to claim 5 wherein the said polymeric reinforcing agents in said reinforcing layer are identical.

7. A battery according to claim 6 wherein said bonding agent is a polymer substantially inert to bromine and selected from the class consisting of polyfluorocarbons, polychlorofluorocarbons, polymers of monomers containing a major portion of vinylidene chloride, poly (vinyl chloride), poly (methyl methacrylate), polyethylene, and polypropylene.

8. A battery according to claim 1 wherein said battery includes a metallic conducting member secured to said carbon sheet and protruding from said battery for making electrical connection to said battery.

9. A battery according to claim 8 including a thin metal film electroplated onto said carbon sheet, and a conductive adhesive bonding said metallic conducting member to said electroplated metal film.

10. A battery according to claim 9 wherein said electroplated metal is zinc.

11. A battery according to claim 1 wherein said electrode is a cathode, and includes a halogen-entrapment layer, said entrapment layer being bonded to said reinforcing layer, inert to halogen in concentrations present in said battery, and comprising a halogen entrapping substance.

12. A battery according to claim 11 wherein said halogen is bromine and said halogen-entrapment layer comprises bromine adsorbent particles and a bonding agent securing said particles into a integral layer, said bonding agent being inert to bromine in concentrations present in said battery, said layer having a bromine adsorptivity of at least about 0.5 g. of bromine per gram of said layer.

13. A battery according to claim 12 wherein said bonding agent is a polymer inert to bromine and selected from the class consisting of polyfluorocarbons, polychlorofluorocarbons, polymers of monomers containing a major portion of vinylidene chloride, poly (vinyl chloride), poly (methyl methacrylate), polyethylene, and polypropylene.

14. A battery according to claim 13 wherein said bonding agent is identical to said polymeric reinforcing agent.

15. A battery according to claim 12 wherein said bromine adsorbent is activated carbon.

16. A battery according to claim 1 wherein said electrode is an anode, and said reinforcing layer provides an electroplating surface for said metal.

17. A battery according to claim 16 wherein said electroplatable metal is zinc and said electroplating surface has a rough texture providing a large number of electroplating sites for said metal.

18. A battery according to claim 1 comprising anodic and cathodic electrodes including at least two of said externally electrically connectable electrodes, wherein
one said electrode is a cathode comprising additionally a halogen entrapment layer, inert to halogen in concentrations present in said battery, comprising a halogen-entrapping substance,
each cathodic electrode has an extended surface adapted to be adjacent said liquid medium, said halogen-adsorbent layer providing said extended electrolyte-contacting surface for said externally electrically connectable cathode, and
the other said electrode is an anode having an electroplating surface for said metal, parallel to the adjacent extended cathode surface.

19. A battery according to claim 21 including a porous separator element between adjacent cathode and anode surfaces, whereby the tendency of halogen to migrate from said cathode to said anode is lessened.

20. A rechargeable metal halide battery, in which a salt of an electroplatable metal and a halogen selected from the group consisting of chlorine, bromine and iodine is electrolyzed from solution in a liquid electrolyte medium during the charging cycle and reformed during the discharging cycle, comprising at least one nonmetallic electrode suitable for connection to an external electrical circuit to charge and discharge said battery, adapted to be immersed in said liquid medium, having an extended surface for contacting said liquid medium, and a total interface resistance, per square inch of said extended surface, not greater than about 0.10 ohm,
said electrode comprising an electroconductive layer formed of highly electroconductive carbon particles bonded together in an integral layer by a polymeric reinforcing agent which is inert to said halogen in concentrations present in said battery,
said electroconductive layer being at least coextensive with said extended electrolyte-contacting surface, and having a resistivity, $p$, not greater than $(0.10 \times d)/l^2$ ohm-in., where $d$ is the thickness of said conductive layer and $l$ is the longest electrical flow path through the said conductive layer from the electrolyte to the point on said layer at which the external electrical connection is made to said layer.

21. A battery according to claim 20 wherein said conductive layer consists essentially of at least about 90 percent by weight of said highly electroconductive carbon particles.

22. A battery according to claim 20 wherein said halogen is bromine and said reinforcing agent is a polymer substantially inert to bromine and selected from the class consisting of polyfluorocarbons, polychlorofluorocarbons, polymers of monomers containing a major portion of vinylidene chloride, poly (vinyl chloride), poly (methyl methacrylate), polyethylene, and polypropylene.

* * * * *